United States Patent [19]

Gaal

[11] Patent Number: 4,651,436
[45] Date of Patent: Mar. 24, 1987

[54] PROBE FOR MEASURING DEVIATIONS FROM LINEARITY

[76] Inventor: Peter S. Gaal, 1714 Mountain View Dr., Monroeville, Pa. 15146

[21] Appl. No.: 741,546

[22] Filed: Jun. 5, 1985

[51] Int. Cl.$^4$ .............................................. G01B 7/31
[52] U.S. Cl. ........................................ 33/533; 33/542; 33/DIG. 13
[58] Field of Search ............ 33/178 F, DIG. 13, 533, 33/542, 543, 544, 143 L

[56] References Cited

U.S. PATENT DOCUMENTS

| | | | |
|---|---|---|---|
| 2,619,728 | 12/1952 | Ely | 33/544 |
| 3,153,286 | 10/1964 | Buisson | 33/168 R |
| 3,496,644 | 2/1970 | Short | 33/544 |
| 3,821,856 | 7/1974 | Rapp | 33/178 E |
| 3,983,631 | 10/1976 | Dutzler | 33/143 L |
| 4,087,918 | 5/1978 | Schmid et al. | 33/143 L |
| 4,235,020 | 11/1980 | Davis et al. | 33/178 F |

Primary Examiner—Willis Little

[57] ABSTRACT

Disclosed is an apparatus for measuring the deviation from a straight line of an elongated passage having opposing sides. The apparatus comprises a member sufficiently bendable and sufficiently large that it can pass through the passage in contact with both of the sides of the passage. Included is a means for measuring the amount that the member bends as it passes through the passage, means for moving the member through the passage between its opposing sides, and means to indicate, collect, and analyze the resultant electrical signals. The apparatus is most useful in measuring and locating deformations in the tubes of the steam generators of nuclear reactors.

15 Claims, 7 Drawing Figures

PROBE FOR MEASURING DEVIATIONS FROM LINEARITY

BACKGROUND OF THE INVENTION

The tubes in the primary loops of steam generators of nuclear reactors are subjected to high temperatures and pressures, radioactive bombardment, and attack by corrosive materials carried in the steam that passes through them. As a result, they frequently bend or deform from a straight or linear configuration. Because deformation usually precedes failure, it is necessary to periodically ascertain the deformation of these tubes so that dangerously deformed tubes can be plugged or replaced. In order to rationally decide how likely a deformed tube is to fail, one must know not only how much the tube is deformed, but also where along the tube the deformation occurs, as well as its direction.

Since the tubes are not visible or otherwise accessible from the outside, this information must be obtained by examining the inside of the tubes. The examination must be as precise as possible, of course, for otherwise tubes in acceptable condition will be unnecessarily plugged or replaced, or worse, a defective tube will not be detected and conceivably could fail, permitting contaminated water to enter the secondary loop. The problem is difficult because the tubes, of which there may be several thousand, are vertical, and can be only ¼ to 1 inch in inside diameter, yet longer than 15 feet. In addition, the area where the examination must be performed is highly radioactive, so the examination must be done as quickly as possible to reduce radiation exposure to humans.

SUMMARY OF THE INVENTION

I have invented a probe, which, when driven through a confined passage, or over a surface, will provide electrical signals that are proportional to the deformation of the passage or surface from linearity. Two of these electrical signals can independently indicate the amount of bending in directions that are at right angles, and therefore the amount of bending in any direction can be determined. The apparatus of this invention can also precisely measure the position of deformations along tubes, and the direction of the deformations.

Moreover, when the apparatus is used to examine the tubes in a steam generator of a nuclear reactor, very little human exposure time to radiation is required because the apparatus can be quickly attached to the bank of tubes in the steam generator at the tube sheet. Once attached, no human manipulation or control in the highly radioactive area of the steam generator is required to operate the apparatus.

DESCRIPTION OF THE INVENTION

Figure 1:
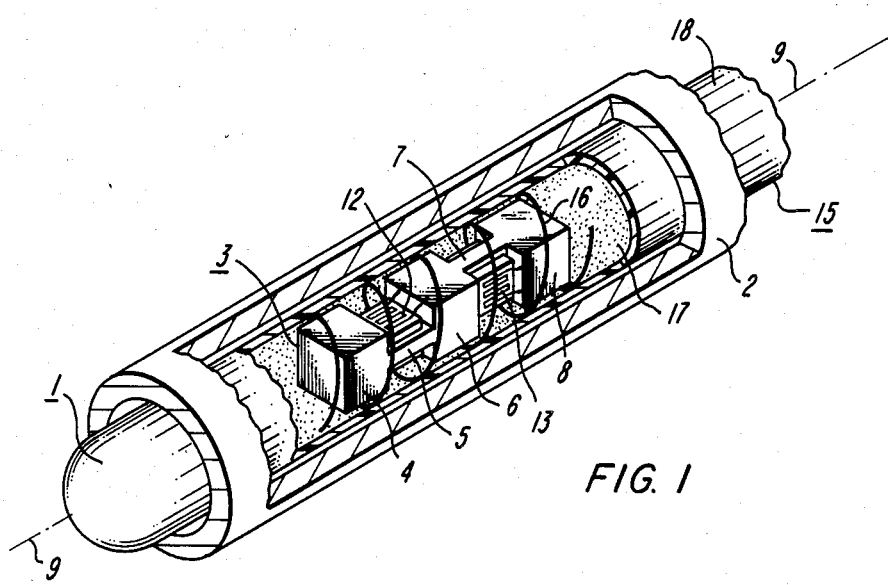
FIG. 1 is an isometric view partially in section illustrating a certain presently preferred embodiment of a probe according to this invention.
Figure 2:
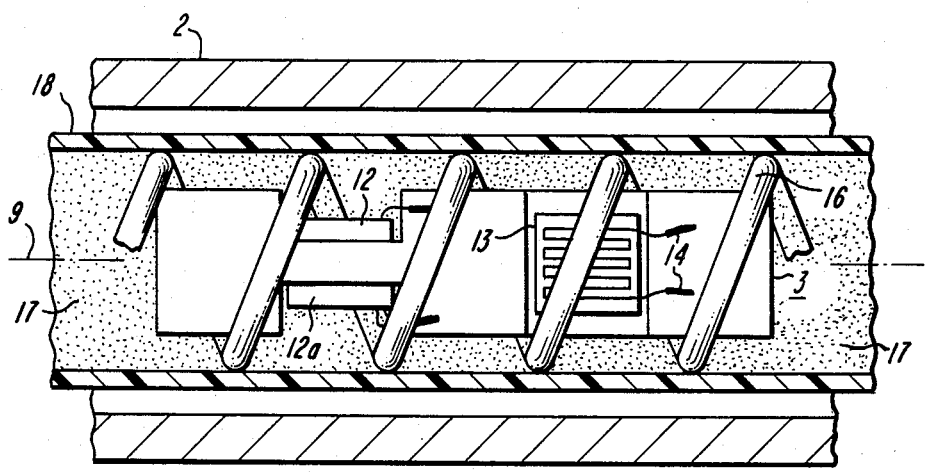
FIG. 2 is a side view in section illustrating a portion of the probe shown in FIG. 1.

In FIGS. 1 and 2, a probe 1 in tube 2, consists of an elongated member 3 which is composed of sections 4, 5, 6, 7, and 8. Sections 4, 6, and 8 are rigid or are equally flexible in all directions, or are equally flexible in two directions that are perpendicular to the longitudinal axis 9 of tube 2 and of member 3. Sections 5 and 7 are more flexible than sections 4, 6, and 8, although sections 4, 6, and 8 should also be somewhat flexible, for otherwise the probe may become stuck in sharp bends, or its usefulness will be limited to channels of limited deformation. Sections 5 and 7 are more easily flexed around axes 10 and 11, respectively, which are at right angles, and are also at right angles to axis 9. The increased flexibility of sections 5 and 7 over sections 4, 6, and 8 is due to the constriction of member 3 at these sections, where indentations from each side of member 3 insure that sections 5 and 7 will bend along axes 10 and 11, respectively, before sections 4, 6, and 8 will bend in those directions. In directions that are normal to those directions, however, sections 5 and 7 are about as inflexible as are sections 4, 6, and 8.

Mounted on the flexing surfaces of sections 5 and 7 are strain sensors 12 and 13, respectively. Similar strain sensors (only strain sensor 12a is shown) are mounted on the opposite sides of these surfaces. These strain sensors generate an electrical signal that is proportional to the amount that these surfaces are flexed. Wires 14 carry this current from the probe through wand 15 to apparatus (not shown) for analyzing these signals. Coiled over member 3 in contact therewith is a spring 16 which tends to restore member 3 to a linear configuration whenever it is deformed from linearity by the walls of tube 2. An elastomeric material 17 encapsulates spring 16 to maintain a fixed relationship between member 3 and spring 16. A protective jacket 18 encloses elastomeric material 17 to reduce friction between the probe and the inside walls of tube 2. As probe 1 is driven along the walls of tube 2, any deviation in the walls of tube 2 from a straight line forces protective jacket 18 to bend the same amount, which, in turn, transmits the deformation to sensors 12 and/or 13.

Figure 3:
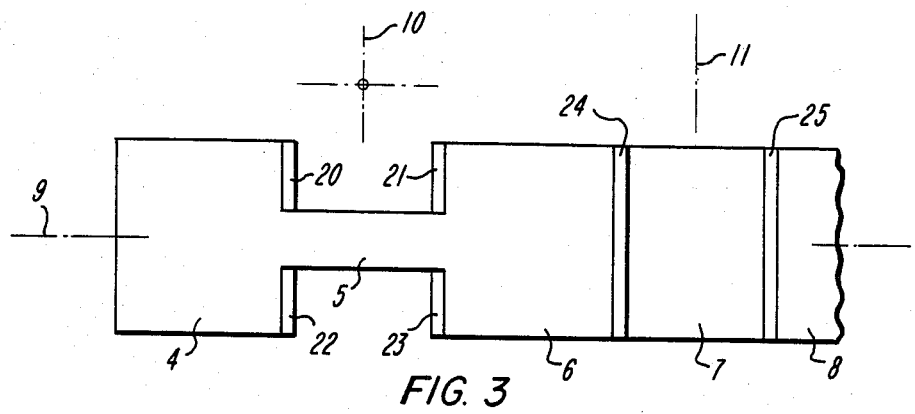
FIG. 3 is a side view in section illustrating another embodiment of a portion of the probe shown in FIG. 1.

In FIG. 3, capacitance type displacement sensing devices consisting of plate pairs 20 and 21, 22 and 23, and 24 and 25, and a pair opposite pair 24 and 25 (not shown), are mounted on the sides of sections 4, 6, and 8 of member 3, rather than on sections 5 and 7 as is shown in FIGS. 1 and 2.

Figure 4:
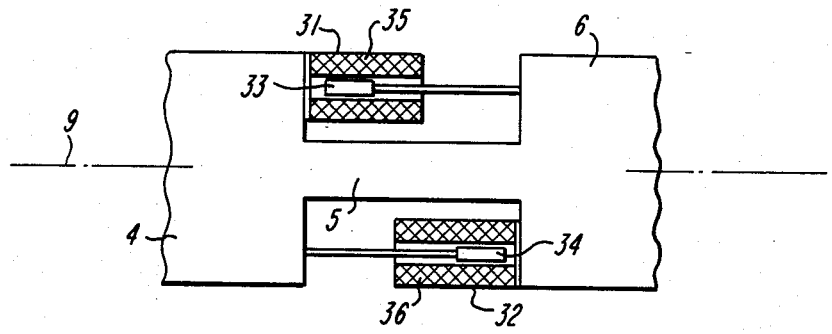
FIG. 4 is a side view in section illustrating still another embodiment of a portion of the probe shown in FIG. 1.

FIG. 4 illustrates another variation, where linear variable differential transformers (LVDT) 31 and 32 are mounted between sections 4 and 6, and between sections 6 and 8 (not shown). Movements by sections 4 and 6 together or apart move iron cores 33 and 34 within coils 35 and 36 of LVDT's 31 and 32, respectively, generating electrical signals that are proportional to the amount of movement.

Figure 5:
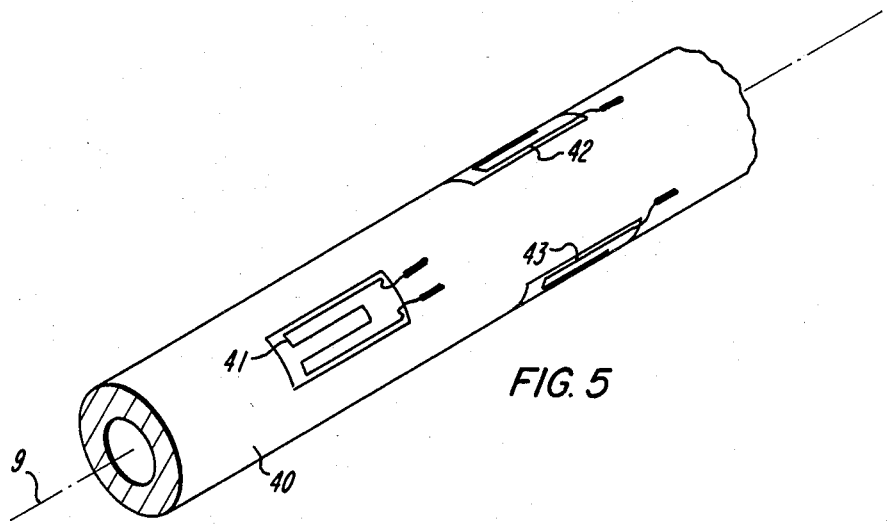
FIG. 5 is an isometric view illustrating another embodiment of a portion of a probe according to this invention.

FIG. 5 illustrates a tubular member 40, where all sections of the member are equally flexible in all directions. Stress sensing devices 41, 42, and 43, and one opposite device 41 (not shown), are mounted on the outside of member 40.

Figure 6:
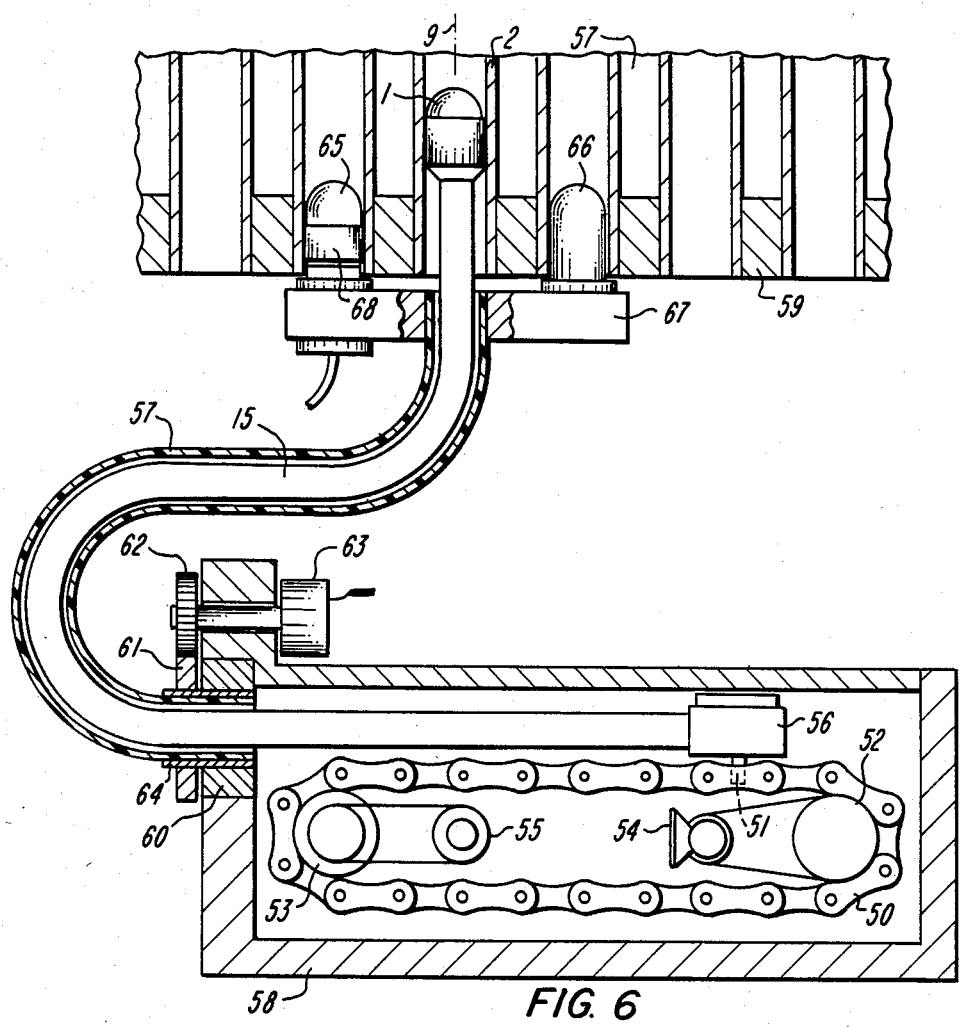
FIG. 6 is a side view, partially in section, illustrating a certain presently preferred embodiment of an apparatus for driving a probe according to this invention.

FIG. 6 illustrates an apparatus for driving probe 1 into tube 2. One end of wand 15 is attached to a block 56 having a pin 51 which engages it with a chain belt 50. Chain belt 50 is driven by sprocket 52 which is coupled to motor 54. In addition to sprocket 52 the chain belt 50 is also supported by driven sproket 53 which is coupled to position encoder 55. As belt 50 moves, wand 15 is forced through a flexible conduit 57 which connects drive housing 58 with support plate 59 of the tube bundle of the steam generator. Although conduit 57 is flexible, it is made to resist torsional deformation. Conduit 57 is attached to drive housing 58 via a rotary coupling comprised of sleeve 64 and bearing 60 with gear 61 fixed to the sleeve 62. Gear 61 is coupled by another gear 62 to a rotary transducer 63 that indicates the position (twist) of the conduit at any point in time when the probe is inserted into the generator. This twist is then referenced to the arbitrary position of the drive housing 58 which is positioned in a known relationship to the support plate 59 of the tube bundle. The orientation of the probe is then determined by the azimuthal orientation of two other locating pins 65 and 66 inserted into two adjacent tubes. The two pins are tied together in a gripper block 67 fastened to the conduit in a pneumatically expanded elastic anchor 68. Pressurized air fed through tube 69 keeps the gripper block 67 in place during a measurement scan of a tube.

Figure 7:
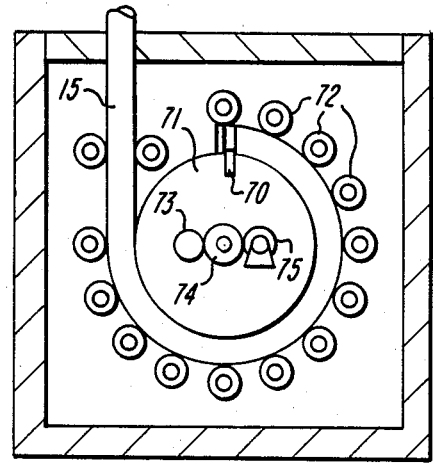
FIG. 7 is a side view, partially in section, illustrating another embodiment of an apparatus for driving a probe according to this invention.

FIG. 7 illustrates an alternative apparatus for driving wand 15, where wand 15 is to attached by pin 70 to a rotating drum 71 and trapped in place by a series of idle rollers 72 surrounding the drum. This configuration allows a single or multiple wraps of the wand on the drum. Drum 71 is driven by motor 73 through gear 74. Gear 74 is also coupled to rotational transducer 75, so that the orientation of probe 1 in tube 2 can be determined as in FIG. 6.

Member 3 may be constructed in a variety of ways from many different materials. If it is desired to measure deformation in only one direction, the member would need to be flexible only in that direction. The member should be sufficiently resilient to "unflex" when the deforming force of the tube is lessened. This can be accomplished, for example, by choosing a resilient polymeric material such as nylon, rubber, or metallic materials such as spring steel, for the flexing portion of the member. While several different materials can be used in making the member, it is preferable to construct the member out of a single piece of resilient polymeric material, as shown in FIG. 1, because construction is simplified. Nylon is the preferred resilient polymeric material because it has about the right degree of strength, flexibility, and resiliency required for best performance. The tendency of a resilient member to return to its initial undisturbed shape when not forced to bend can be greatly enhanced by the addition of one or more helically wound springs surrounding it along its entire length. The member may be square, circular, polygonal, or of other cross-sectional shape, and can be solid or tubular. If the member has a more flexible portion, it should have at least two portions that contact the surface being examined, with the more flexible portion inbetween. Preferably, the member has three sections that contact the surface being examined, and two portions inbetween that flex in directions at right angles, so that deformations in all directions can be measured. However, when a plurality of sections is used the sequence repeats the above.

A variety of devices can be used to measure the bending of the member. Typical sensors include resistive strain gauges, piezoelectric crystal gauges, capacitance sensors, linear variable differential transformers, magnetic reluctance sensors, inductance sensors, capacitance sensors, and digitally encoded magnetic sensors. Resistive strain gauges are preferred as they are small, inexpensive, reliable, and have been found to work well. Each sensor is generally attached to the member at at least two points spaced apart along its longitudinal axis, with at least part of the flexing portion of the member inbetween; the sensor then detects the movement of these two points together and apart. It is preferable to use a redundant sensor on the opposite side of the flexing portion of the member, and to sum the results (taking direction of movement into account), to obtain a larger signal and a more precise measurement of the amount of deformation. The sensors can be mounted in a variety of ways, as shown in the drawings. The output of the sensor is preferably an electrical signal, although other types of signals, such as changes in air flow, light intensity, light reflection, or sound echo could also be used. An electrical signal output can be converted to observable form, by, for example, operating a magnet that moves a needle or a pen across moving paper. It is preferable, however, to analyze the signal with a computer, especially if there are sensors at right angles, so that the amount of deformation, direction of deformation, and position of deformation can be calculated and displayed in an easily understood form. For example, a graph can be drawn which gives the amount of incremental deformation (in the direction of maximum deformation) along the ordinate, and the position of the deformation along the abscissa. Computer programs for doing this are known and available.

If the surface itself does not confine the probe, then the means for driving the probe across the surface must include means for pressing the probe against the surface. For example, if the convolutions of a turbine blade are to be examined, the probe can be mounted on springs which ride over an opposing surface and press it against the turbine blade. A wand, which drives and retrieves the probe from a confined passage such as a channel, or a tube, is preferably made of a material, such as woven fiber or wire embedded in or covered with a low-friction elastomer, which will neither compress nor stretch in its elongated direction, so that the position of the probe in the tube can be determined, and which will not twist, so that the orientation of the probe within the tube can be determined. At the same time, however, the wand must, of course, be be sufficiently flexible to pass by whatever bends it encounters in the passage. It is also desirable that that the wand contain the wires from the pressure sensing devices mounted on the probe so that they do not become entangled or damaged.

The probe of this invention can be used to measure the deformation of any surface, including tubes, turbine blades, channels, nuclear fuel bundles, and filters. It is only necessary that the probe be pressed against the surface as it is driven across it, sufficiently for the flexing portion of the member to bend so that the probe conforms to the contours of the surface. The probe is especially useful, however, in measuring the deformation of tubes, such as the heat exchange tubes in the steam generators of nuclear reactors.

I claim:

1. Apparatus for measuring the deviation from a straight line of an elongated passage having opposite sides comprising
   a member sufficiently large that it can pass through said passage in contact with said opposing sides, said member being bendable along two axes 90 degrees to each other, both perpendicular to the direction of movement of said member;

means for measuring the amount that said member bends as it passes through said passage; and means for moving said member through said passage between said opposing sides.

2. Apparatus according to claim 1 wherein said passage is a tube.

3. Apparatus according to claim 2 wherein said means for moving said member is a flexible wand attached to one end of said member.

4. Apparatus according to claim 3 wherein said wand is longitudinally inelastic and incompressible, and torsionally rigid.

5. Apparatus according to claim 3 including means for determining the position of said member along said passage.

6. Apparatus according to claim 5 wherein said means for determining the position of said member is a measurement of the length that said wand extends into said passage.

7. Apparatus for measuring the deviation of a tube from linearity comprising (A) a probe elongated in the direction of said tube, said probe comprising
  (1) two sections, each having an axis perpendicular to said direction along which each of said sections is most easily flexible, each of said axes being perpendicular to the other of said axes; and
  (2) three less flexible sections alternating with said two sections, said three sections being in slid able contact with the inside of said tube;

(B) means mounted on said member for measuring the amount of bending along each said axes of said two sections;

(C) means for driving said probe through said tube;

(D) means for determining the position of said probe in said tube; and (E) means for determining the orientation of said probe in said tube.

8. Apparatus according to claim 7 wherein said means for determining the orientation of said member in said tube is means for preventing said member from turning in said tube, and coupling said drive by way of torsionally resistive means to said tube.

9. Apparatus according to claim 7 wherein said member is a single piece of solid polymeric material, and each of said two sections consists of opposing indentations in said polymeric material.

10. Apparatus according to claim 9 wherein said polymeric material is nylon.

11. Apparatus according to claim 7 wherein said probe includes a spring wound over said member and enclosed in an elastomeric material.

12. Apparatus according to claim 7 wherein said means for driving said probe through said tube is a flexible wand that is attached to one end of said probe and is longitudinally inelastic and incompressible, and torsionally rigid.

13. Apparatus according to claim 12 wherein the other end of said wand is attached to a rotatable drum over which said wand in wound.

14. Apparatus according to claim 12 wherein said means for determining the orientation of said probe in said tube is a means for fixing the orientation of said wand relative to said tube.

15. Apparatus according to claim 7 including means for collecting, recording, and analyzing signals from said probe.

* * * * *